(12) United States Patent
Zhang et al.

(10) Patent No.: US 11,290,868 B2
(45) Date of Patent: Mar. 29, 2022

(54) SUBSCRIPTION INFORMATION CONFIGURATION

(71) Applicant: Lenovo (Beijing) Limited, Beijing (CN)

(72) Inventors: Zhuoyun Zhang, Beijing (CN); Jing Han, Beijing (CN); Haiming Wang, Beijing (CN); Lianhai Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 16/638,447

(22) PCT Filed: Aug. 11, 2017

(86) PCT No.: PCT/CN2017/097263
§ 371 (c)(1),
(2) Date: Feb. 11, 2020

(87) PCT Pub. No.: WO2019/028909
PCT Pub. Date: Feb. 14, 2019

(65) Prior Publication Data
US 2020/0260259 A1    Aug. 13, 2020

(51) Int. Cl.
*H04W 8/20* (2009.01)
*H04W 4/44* (2018.01)
(Continued)

(52) U.S. Cl.
CPC .............. *H04W 8/20* (2013.01); *G08G 5/006* (2013.01); *G08G 5/0069* (2013.01);
(Continued)

(58) Field of Classification Search
CPC ......... H04W 8/20; H04W 12/00; H04W 4/50; H04W 4/025; H04W 8/12; H04W 4/44;
(Continued)

(56) References Cited

U.S. PATENT DOCUMENTS

| 2014/0045452 | A1* | 2/2014 | Ma ......................... H04W 4/70 455/406 |
| 2015/0142211 | A1* | 5/2015 | Shehata .................. H04W 4/42 701/2 |

(Continued)

FOREIGN PATENT DOCUMENTS

| CN | 205121346 U | 3/2016 |
| EP | 3611969 A1 | 2/2020 |

(Continued)

OTHER PUBLICATIONS

PCT/CN2017/097263, International Search Report, Patent Cooperation Treaty, dated Apr. 28, 2018, p. 1-3.
(Continued)

*Primary Examiner* — Muthuswamy G Manoharan
(74) *Attorney, Agent, or Firm* — Kunzler Bean & Adamson (57) ABSTRACT

Methods and system are disclosed for subscription information configuration (200). A method comprises transmitting a subscription information configuration message from an external server to an authenticate apparatus, wherein the subscription information configuration message includes assistance information that configures parameters of a base unit for a mobile unit; authenticating, at the authenticate apparatus, the subscription information configuration message, and in response to a success of the authentication, sending the subscription information configuration message to a subscriber server; and storing, at the subscriber server, the subscription information configuration message.

19 Claims, 6 Drawing Sheets

(51) Int. Cl.
*H04W 4/50* (2018.01)
*H04W 4/02* (2018.01)
*H04W 8/12* (2009.01)
*H04W 12/06* (2021.01)
*H04B 7/185* (2006.01)
*G08G 5/00* (2006.01)
*H04W 8/14* (2009.01)

(52) U.S. Cl.
CPC ........ *H04B 7/18506* (2013.01); *H04W 4/025* (2013.01); *H04W 4/44* (2018.02); *H04W 4/50* (2018.02); *H04W 8/12* (2013.01); *H04W 8/14* (2013.01); *H04W 12/06* (2013.01)

(58) Field of Classification Search
CPC ... H04B 7/18506; G08G 8/0069; G08G 5/006
See application file for complete search history.

(56) References Cited

U.S. PATENT DOCUMENTS

| | | | |
|---|---|---|---|
| 2016/0125740 A1 | 5/2016 | Pasko et al. | |
| 2016/0316363 A1* | 10/2016 | Li | H04L 12/2809 |
| 2017/0078867 A1* | 3/2017 | Ianev | H04W 76/27 |
| 2017/0127290 A1 | 5/2017 | Uelk et al. | |
| 2017/0215035 A1 | 7/2017 | Senba | |
| 2018/0375568 A1* | 12/2018 | De Rosa | H04W 72/04 |
| 2020/0120563 A1* | 4/2020 | Tak Cs | H04W 16/18 |
| 2020/0221280 A1* | 7/2020 | Hong | H04W 12/71 |
| 2020/0236546 A1* | 7/2020 | Yu | H04W 48/16 |

FOREIGN PATENT DOCUMENTS

| | | | | |
|---|---|---|---|---|
| KR | 20180047488 A | * | 10/2016 | G06Q 50/10 |
| WO | 2017136627 A1 | | 10/2017 | |

OTHER PUBLICATIONS

PCT-CN2017/097263, Written Opinion of the International Searching Authority, Patent Cooperation Treaty, dated Apr. 28, 2018, p. 1-3.

LG Electronics Inc, Aerial UE Identification, 3GPP TSG-RAN WG2 Meeting #98 R2-1705659, May 15-19, 2017, pp. 1-2, Hangzhou, China.

Huawei, et al., Identification of air-borne drones, 3GPP TSG-RAN WG2 Meeting #98 R2-1705000, May 15-19, 2017, pp. 1-3, Hangzhou, China.

* cited by examiner

SUBSCRIPTION INFORMATION CONFIGURATION

FIELD

The subject matter disclosed herein generally relates to wireless communications and more particularly relates to subscription information configuration.

BACKGROUND

The following abbreviations are herewith defined, at least some of which are referred to within the following description: Third Generation Partnership Project ("3GPP"), Positive-Acknowledgment ("ACK" or "Ack"), Access Stratum ("AS"), Downlink ("DL"), Evolved Node B ("eNB"), Equipment Identity Register ("EIR"), Frequency Division Multiple Access ("FDMA"), Home Subscriber Server ("HSS"), Long Term Evolution ("LTE"), Multiple Access ("MA"), Mobility Management Entity ("MME"), Mobile Equipment ("ME"), Non-access Stratum ("NAS"), Next Generation Node B ("gNB"), Orthogonal Frequency Division Multiplexing ("OFDM"), PDN GateWay ("PGW"), Radio Resource Control ("RRC"), Access Network ("AN"), Radio Access Network ("RAN"), Radio Link Failure ("RLF"), Service Capability Exposure Function ("SCEF"), Single Carrier Frequency Division Multiple Access ("SC-FDMA"), Serving GateWay ("SGW"), User Entity/Equipment (Mobile Terminal) ("UE"), Uplink ("UL"), Worldwide Interoperability for Microwave Access ("WiMAX"), Core Access and Mobility Management Function ("AMF"), Network Exposure Function ("NEF"), Session Management Function ("SMF"), Unified Data Management ("UDM"), User plane Function ("UPF") and Application Function ("AF").

There has been increasing interest in covering the aerial vehicles such as drones with cellular networks. The use cases of commercial drones are growing very rapidly and include package delivery, search-and-rescue, monitoring of critical infrastructure, wildlife conservation, flying cameras, and surveillance. All of these use cases could see rapid growth and more will emerge in coming years. Many of these emerging use cases could benefit from connecting drones to the cellular network as a UE. LTE is well positioned to serve aerial vehicles such as drones. In fact, there have been an increasing number of field-trials involving the use of LTE networks to provide connectivity to drones. It is predicted that a rapid and vast growth in the drone industry will bring new promising business opportunity for LTE operators. To address this growing market demand, a new study item (SI) called as "Study on enhanced LTE Support for Aerial Vehicles" has been approved by 3GPP TSG RAN #75 [1]. The following enhancements were proposed:

Interference mitigation solutions for improving system-level performance in both UL and DL;
   Solutions to detect whether UL signal from an air-borne UE increases interference in multiple neighboring cells and whether an air-borne UE incurs interference from multiple cells;
   Identification of an air-borne UE that does not have proper certification for connecting to the cellular network while air-borne;
Handover: Identify if enhancements in terms of cell selection and handover efficiency as well as robustness in handover signaling can be achieved;

Positioning: If time allows as the 2nd priority, assess the achievable accuracy with existing positioning techniques and identify potential enhancements.

The solutions related with drone UE are mainly discussed in RAN 2 now. The following contributions have been submitted to RAN 2 meeting.

1. R2-1704997, Mobility enhancement for Drones, Huawei, HiSilicon

This contribution considers and lists a lot of possible enhancements, which are listed as follows. However, no additional detailed information is exposed.
1. Mobility control parameters optimization (TTT, CIO etc)
2. Enhance the measurement report
3. RLF & re-establishment
4. Coordinated scheduling
5. Interference control
6. UE Mobility status evaluation
7. Introduce speed based handover strategy
8. Utilize beamforming technology to improve downlink signal quality
9. Enhanced proximity indication procedure
10. Pre-handover configuration according to drone's fixed flying path information 2. R2-1705999, Proposal of potential LTE enhancements for Aerial Vehicles, KDDI This contribution proposed the following solutions to enhance handover procedure: change the handover related parameters (time to trigger, event threshold . . . etc.); introduce handover prohibit timer mechanism; and activate joint transmission.

However, there are as yet no discussions related with drone UE in SA2. The solution proposed in this disclosure is mainly related to a network capability exposure feature (TS 23. 682) and an attach procedure (TS 23.401).

REFERENCES

[1] RP-170779, "New SID on Enhanced Support for Aerial Vehicles", NTT DOCOMO INC, Ericsson.
[2] R2-1705999, "Proposal of Potential LTE Enhancements for Aerial Vehicles", KDDI
[3] R2-1704997, "Mobility Enhancement for Drones", Huawei, HiSilicon The above references are identified by the RAN group from the radio aspect. However, there exist other problematic issues which also need to be solved.

BRIEF SUMMARY

Methods and systems for subscription information configuration are disclosed. A method of providing the subscription information to the core network is disclosed. An enhanced attach procedure is disclosed.

In one embodiment, a method comprises transmitting a subscription information configuration message from an external server to an authenticate apparatus, wherein the subscription information configuration message includes assistance information that configures parameters of a base unit for a mobile unit; authenticating, at the authenticate apparatus, the subscription information configuration message, and in response to successful authentication, sending the subscription information configuration message to a subscriber server; and storing, at the subscriber server, the subscription information configuration message.

In one embodiment, the assistance information includes at least one of an expected altitude range, an expected speed range, and path information. In another embodiment, in response to the success of the authentication, the subscription information configuration message is converted into a format that is understandable by the base unit, and the converted subscription information configuration message is sent to the subscriber server.

In one embodiment, the subscription information configuration message further includes mobility restriction parameters. The mobility restriction parameters include altitude restriction which defines the maximum altitude of the mobile unit. In response to the mobile unit flying beyond the maximum altitude, the base unit sends an alert message to the external server. The mobility restriction parameters include speed restriction which defines the maximum speed of the mobile unit. In response to the mobile unit flying beyond the maximum speed, the base unit sends an alert message to the external server.

In one embodiment, storing the subscription information configuration message comprising, modifying a previous subscription information configuration message to the subscription information configuration message. The method may further comprise: in response to a successful authentication of the mobile unit by the subscriber server, the subscription information configuration message is sent from the subscriber server to a control node. In response to an attach of the mobile unit to the control node, the subscription information configuration message is sent from the control node to the base unit. The subscription information configuration message is further sent from the base unit to the mobile unit. Preferably, the transmission of the subscription information configuration message is performed in response to a request from the subscriber server.

A system comprises: an authenticate apparatus that receives and authenticates a subscription information configuration message from an external server, wherein the subscription information configuration message includes assistance information that configures parameters of a base unit for a mobile unit; and a subscriber server that stores the subscription information configuration message sent from the authenticate apparatus, wherein the subscription information configuration message is sent from the authenticate apparatus in response to a success of the authentication.

A method comprising: initiating an attach process of a mobile unit; and in response to the authentication of the attach, transmitting a subscription information configuration message to a base unit, wherein the subscription information configuration message includes assistance information that configures parameters of the base unit for the mobile unit and mobility restriction parameters.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6-1 is a schematic diagram illustrating one embodiment of an attach procedure;

FIG. 6-2 is a schematic diagram illustrating a detailed embodiment of the step 620 of the attach procedure.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled "modules", in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
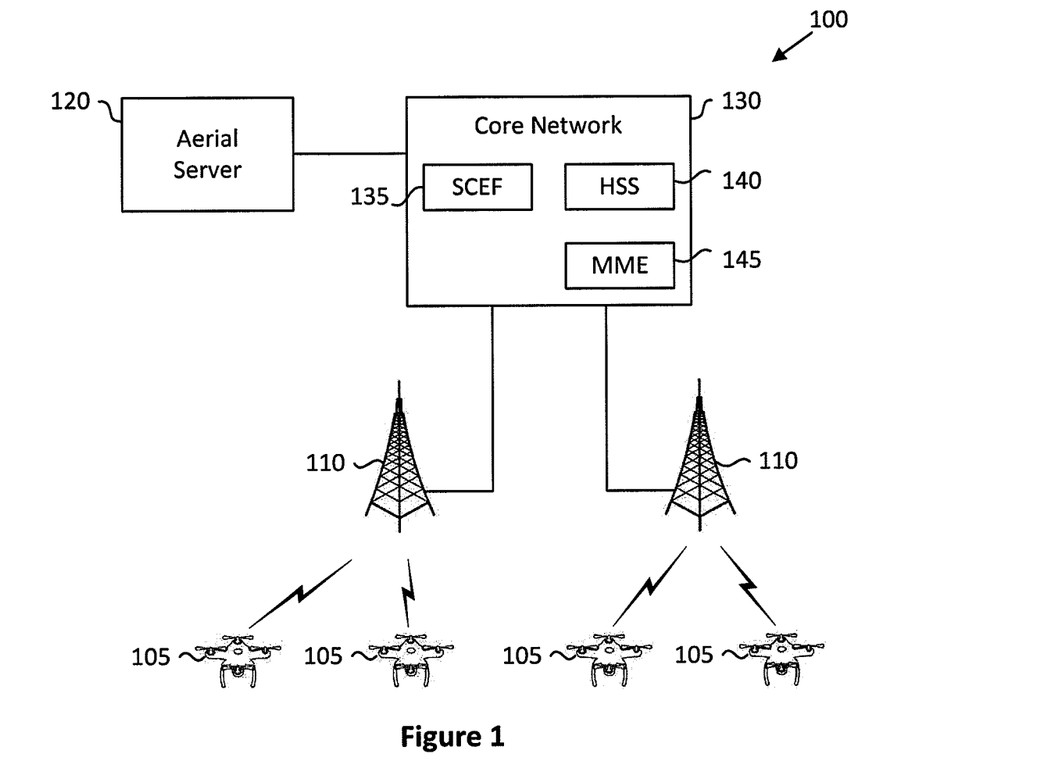
FIG. 1 is a schematic block diagram illustrating one embodiment of a wireless communication system.

FIG. 1 depicts an embodiment of a wireless communication system 100. In one embodiment, the wireless communication system 100 includes mobile units 105, and base units 110, a core network 130 and an aerial server 120. Even though a specific number of mobile units 105 and base units 110 are depicted in FIG. 1, one skilled in the art will recognize that any number of mobile units 105 and base units 110 may be included in the wireless communication system 100. Similarly, even though only one core network 130 and only one aerial server 120 are depicted in FIG. 1, one skilled in the art will recognize that more core networks 130 and more aerial servers 120 could be included in the wireless communication system 100.

In one embodiment, the mobile units 105 may include aerial vehicles such as drones or the like. Examples of use cases of drones include package delivery, search-and-rescue, monitoring of critical infrastructure, wildlife conservation, flying cameras, and surveillance. The mobile units 105 may be referred to as remote units, subscriber units, mobiles, mobile stations, users, terminals, mobile terminals, UEs, subscriber stations, user terminals, a device, or by other terminology used in the art. The mobile units 105 may communicate wirelessly with one or more of the base units 110.

The base units 110 may be distributed over a geographic region. In certain embodiments, a base unit 110 may also be referred to as an access point, an access terminal, a base, a base station, a Node-B, an eNB, a gNB, a Home Node-B, a relay node, a device, or by any other terminology used in the art. The base units 110 connect to the core network 130, which may be coupled to other networks, like the Internet and public switched telephone networks, among other networks, such as the aerial server.

In one implementation, the wireless communication system 100 is compliant with the LTE of the 3GPP protocol. More generally, however, the wireless communication system 100 may implement some other open or proprietary communication protocol. The present disclosure is not intended to be limited to the implementation of any particular wireless communication system architecture or protocol.

The base units 110 may serve a number of mobile units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain.

In one embodiment, the core network 130 is an evolved packet core ("EPC"). In another embodiment, the core network 130 may be a 5G core network. The core network 130 may be coupled to an external server such as the aerial server 120. The present disclosure is not intended to be limited to the implementation of any particular wireless communication system architecture or protocol.

The core network 130 includes several network elements. As depicted, the core network 130 includes a SCEF 135, a HSS 140, and a MME 145. Although a specific number of MME 145 is depicted in FIG. 1, one skilled in the art will recognize that any number of MMEs 145 may be included in the core network 130. Although SCEF 135, HSS 140 and MME 145 are described in the embodiment, a person skilled in the art will recognize that, in 5G network, a Network Exposure Function ("NEF") is equivalent to SCEF, a Unified Data Management ("UDM") is equivalent to HSS, and a Core Access and Mobility Management Function ("AMF") is equivalent to MME. Incidentally, in 5G network, a Session Management Function ("SMF") is equivalent to SGW, a User plane Function ("UPF") is equivalent to PGW, an Application Function is equivalent to external server.

The MME 145 is a control plane network element that handles signaling related to mobility and security for the mobile units 105. The MME may be referred to as a control node. The MME 145 is a termination point for a NAS connection of the remote unit 105 to the core network 130. The HSS 140 is a server that is used for storing subscription information. The SCEF 135 is an apparatus that connects the core network 130 with external servers such as the aerial server 120, among others.

The aerial server 120 is a server that holds information related to mobile units 105, and in particular, related to aerial vehicles. The aerial server 120 holds subscription information configuration that will be explained in detail with reference to FIG. 2. The SCEF 135 authenticates the aerial server 120.

Figure 2:
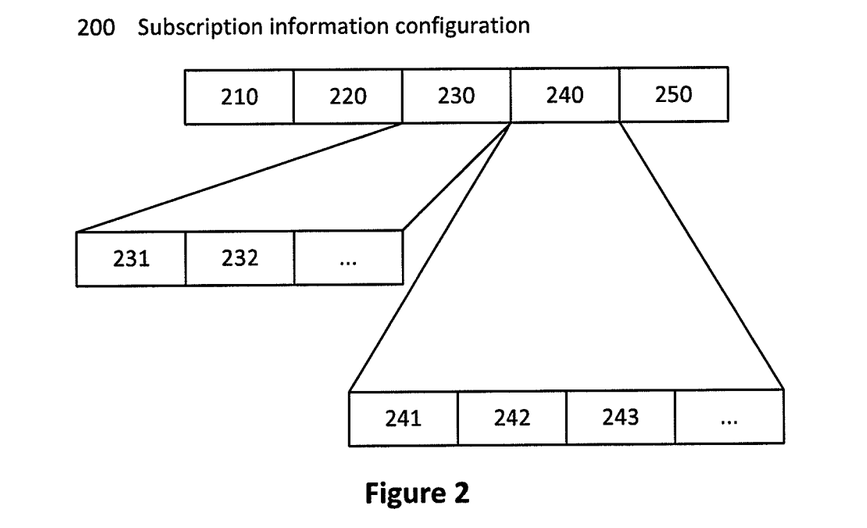
FIG. 2 is a schematic block diagram illustrating one embodiment of a subscription information configuration.

FIG. 2 illustrates a subscription information configuration 200 that is communicated from the aerial server 120 to the core network 130, according to embodiments of the disclosure. A preferred embodiment of the subscription information configuration 200 includes an AS identity 210, a UE identity 220, mobility restrictions 230 and air-borne assistance information 240. A timer information 250 is optionally included in the subscription information configuration 200.

The AS identity 210 is an identity of an aerial server 120. Although FIG. 1 only shows one aerial server 120, a person skilled in the art will recognize that any numbers of aerial servers 120 may be included in the wireless communication system 100. Each aerial server 120 has its unique AS identity 210.

The UE identity 220 is an identity of a mobile unit 105. One aerial server 120 may hold subscription information configuration 200 for any numbers of mobile units 105. Each mobile unit 105 has its unique UE identity 220.

The mobility restrictions 230 serve as a restriction to the behavior of the mobile unit 105. For example, an aerial vehicle, which is a preferred embodiment of the mobile unit 105, may fly much higher than the height for which a base unit is allowed to provide connection. Therefore, a restriction on the height of the aerial vehicle is necessary.

A preferred embodiment of the mobility restrictions 230 includes altitude restriction 231, speed restriction 232, and etc. The altitude restriction 231 defines the maximum altitude of the mobile unit 105. If the mobile unit 105 flies beyond the altitude restriction, the mobile unit 105 may not be able to communication with the base unit 110 or the mobile unit 105 will not be allowed to communicate with the base unit 110. The speed restriction 232 defines the maximum speed of the mobile unit 105. If the mobile unit 105 flies beyond the speed restriction, the mobile unit 105 may not be able to communication with the base unit 110 or the mobile unit 105 will not be allowed to communicate with the base unit 110.

The air-borne assistance information 240 serves as information that may help the base unit configure its parameters to provide a suitable service. A preferred embodiment of the air-borne assistance information 240 includes an expected altitude range 241, an expected speed range 242, path information 243 and etc. The air-borne assistance information 240 may be set by the aerial server 120. Alternatively, the air-borne assistance information 240 may be pre-determined by the core network 130.

The expected altitude range 241 is a preferred height range by which the mobile unit 105 flies. The expected speed range 242 is a preferred speed range by which the mobile unit 105 flies. The path information 243 refers to the path along which the mobile unit 105 flies.

The timer information 250 may be optionally included in the subscription information configuration 200. The timer information 250 may define the expiration time of the subscription information configuration 200. For example, the timer information 250 may be duration of time such as one week, one day, several hours (e.g. 5 hours) or the like. The timer information 250 indicates that after the duration of time (e.g. 5 hours), the subscription information configuration 200 becomes invalid.

Figure 3:
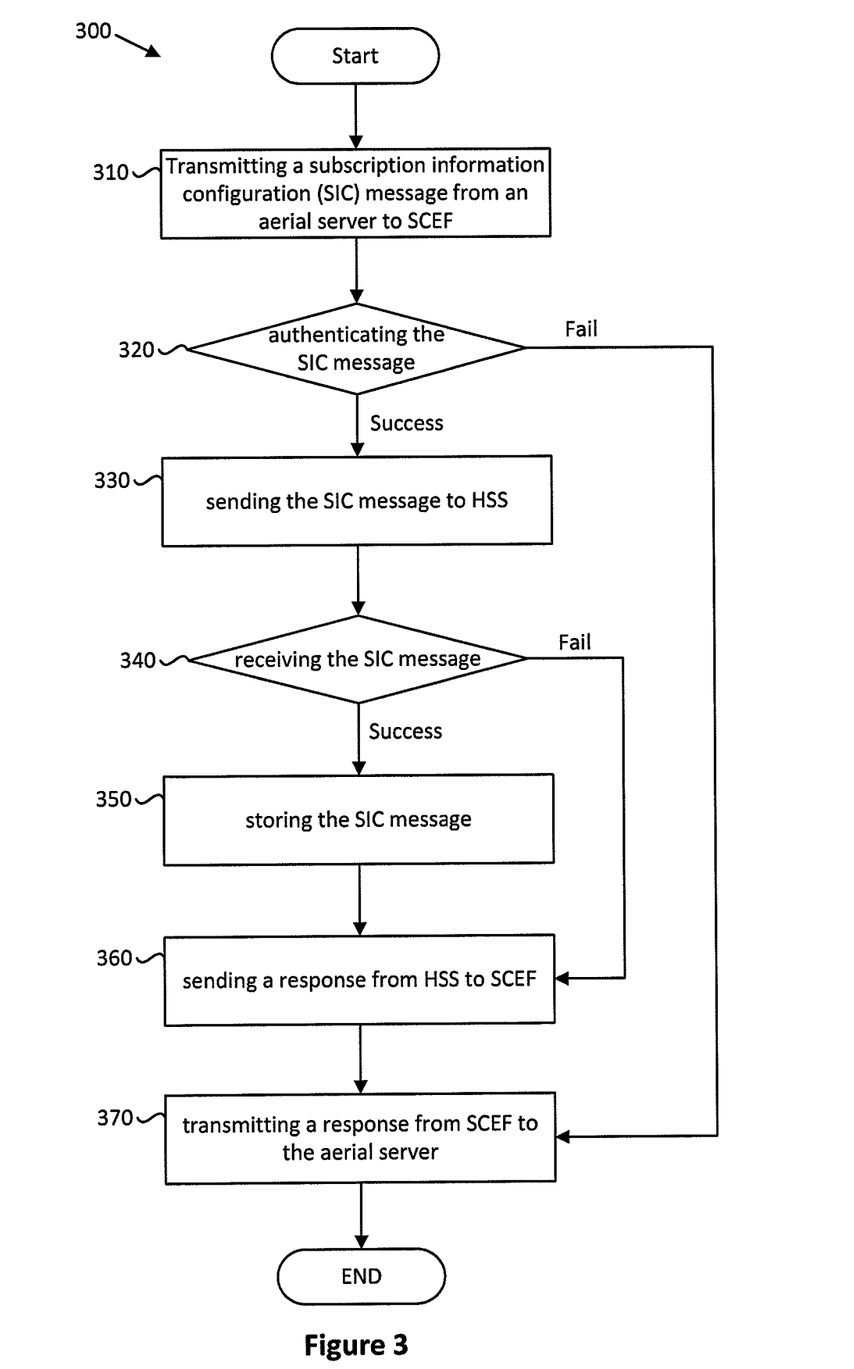
FIG. 3 is a schematic flow chart diagram illustrating one embodiment of a method for subscription information configuration.

FIG. 3 depicts a method (300) for subscription information configuration, according to embodiments of the disclosure. In some embodiments, the method (300) is performed by apparatuses, such as the aerial server 120, the SCEF 135, and HSS 140. In certain embodiments, the method (300) may be performed by a processor executing program code, for example, a microcontroller, a microprocessor, a CPU, a GPU, an auxiliary processing unit, a FPGA, or the like.

The method (300) starts and transmits (310) a subscription information configuration message from the aerial server 120 to the SCEF 135. The transmission of the subscription information configuration message may be initiated by the aerial server 120. Alternatively, the transmission of the subscription information configuration message may be in response to a request by the HSS 140.

As depicted in FIG. 2, the subscription information configuration includes the AS identity 210, the UE identity 220, the mobility restrictions 230 and the air-borne assistance information 240. A person skilled in the art may recognize that the subscription information configuration message may not include all of these contents. For example, the mobility restrictions 230 may not be included. In other words, a subscription information configuration message including only the air-borne assistance information 240 may be transmitted to the SCEF 135.

The method further includes authenticating (320) the subscription information configuration message at the SCEF 135. The SCEF 135 judges whether the AS identity 210 and the UE identity 220 are valid. If this judgment is successful, the SCEF 135 sends (330) the subscription information configuration message to the HSS 140. If this judgment is not successful, the method goes to step 370 that will be discussed later.

The method (300) further includes receiving (340) the subscription information configuration message at the HSS 140. If the receiving is successful, the HSS 140 stores (350) the subscription information configuration message. If the receiving is not successful, the method goes to step 360 that will be discussed later.

In step 350, the HSS 140 stores the subscription information configuration message. If an existing subscription information configuration message for a particular mobile unit 105 has been stored at the HSS 140, the HSS may replace the existing subscription information configuration message with the newly received subscription information configuration message.

As described above, the subscription information configuration message may only include the air-borne assistance information 240 but not the mobility restrictions 230. This may be implemented by sending the subscription information configuration message including both the air-borne assistance information 240 and the mobility restrictions 230, in which the value of the mobility restrictions 230 is set to NULL. A NULL value for a field means that the value of that field is not transmitted. In some embodiments, a NULL value is set to both the air-borne assistance information 240 and the mobility restrictions 230. It is used to delete the existing subscription information configuration message for a particular mobile unit stored at the HSS 140.

The method further includes sending (360) a response from the HSS 140 to the SCEF 135. If the receiving of the subscription information configuration message fails at step 340, a response including a cause value to indicate the failure of the receiving is sent to the SCEF 135. If the receiving of the subscription information configuration message is successful at step 340, after the storing of the subscription information configuration message or the replacement of the existing subscription information configuration message is performed at the step 350, a response including a cause value to indicate the success of the receiving is sent to the SCEF 135.

The method further includes transmitting (370) a response from the SCEF 135 to the aerial server 120. If the authentication fails in step 320, a response containing a cause value to indicate the failure of the authentication is sent to the aerial server 120. If a response including the cause value to indicate the failure or the success of the receiving is received from the HSS 140, the same response is sent from the SCEF 135 to the aerial server 120.

Figure 4:
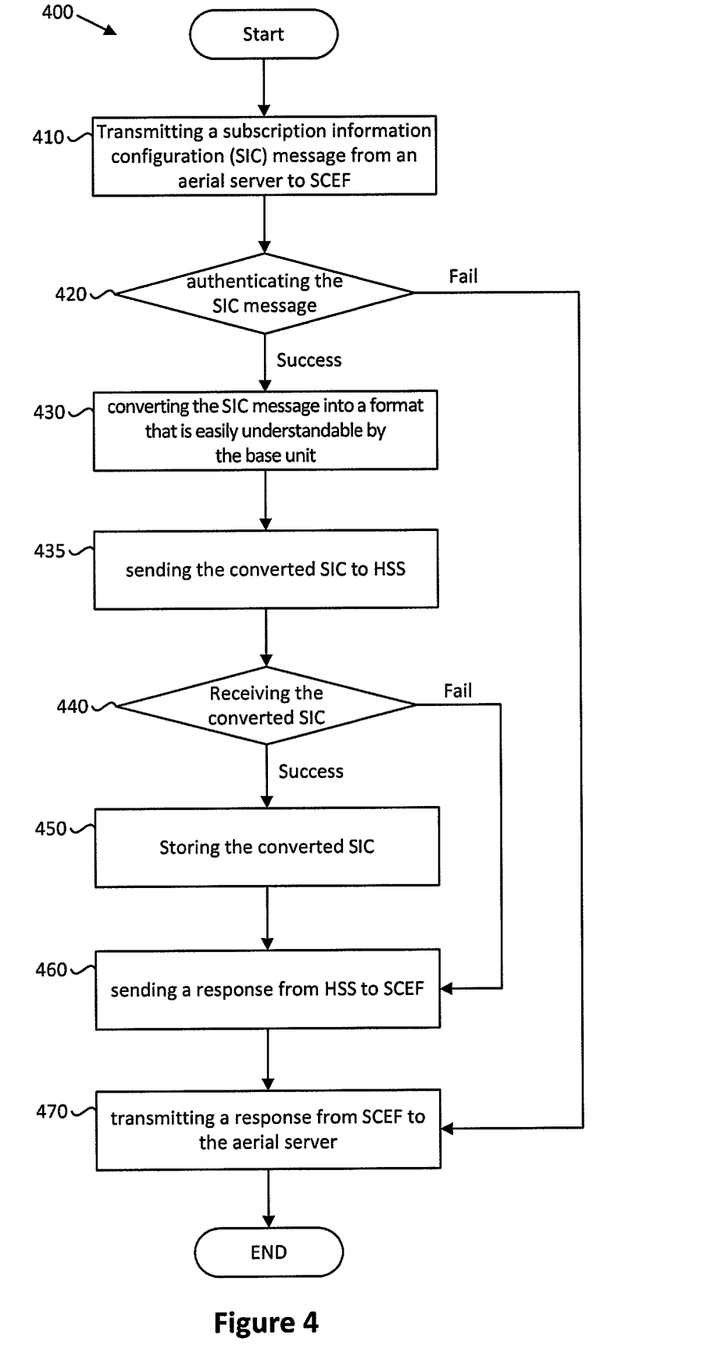
FIG. 4 is a schematic flow chart diagram illustrating another embodiment of a method for subscription information configuration.

FIG. 4 depicts another method (400) for subscription information configuration, according to embodiments of the disclosure. The method (400) differs from the method (300) mainly in the steps 430, 435 and 450. The other steps 410, 420, 440, 460 and 470 are the same as the steps 310, 320, 340, 360 and 370.

In step 330 of FIG. 3, SCEF 135 sends the subscription information configuration message to the HSS 140. On the other hand, according to the embodiment depicted in FIG. 4, the SCEF 135 converts 430 the subscription information configuration 200 into a format that is easily understandable by the base unit 110.

In some embodiments, only a part of the subscription information configuration 200 is converted.

For example, the path information 243 may be converted to a base unit list or a cell list. The list preferably contains an access order. The path information transmitted from the aerial server 120 may include a particular route that a mobile unit 105 will travel.

Figure 5:
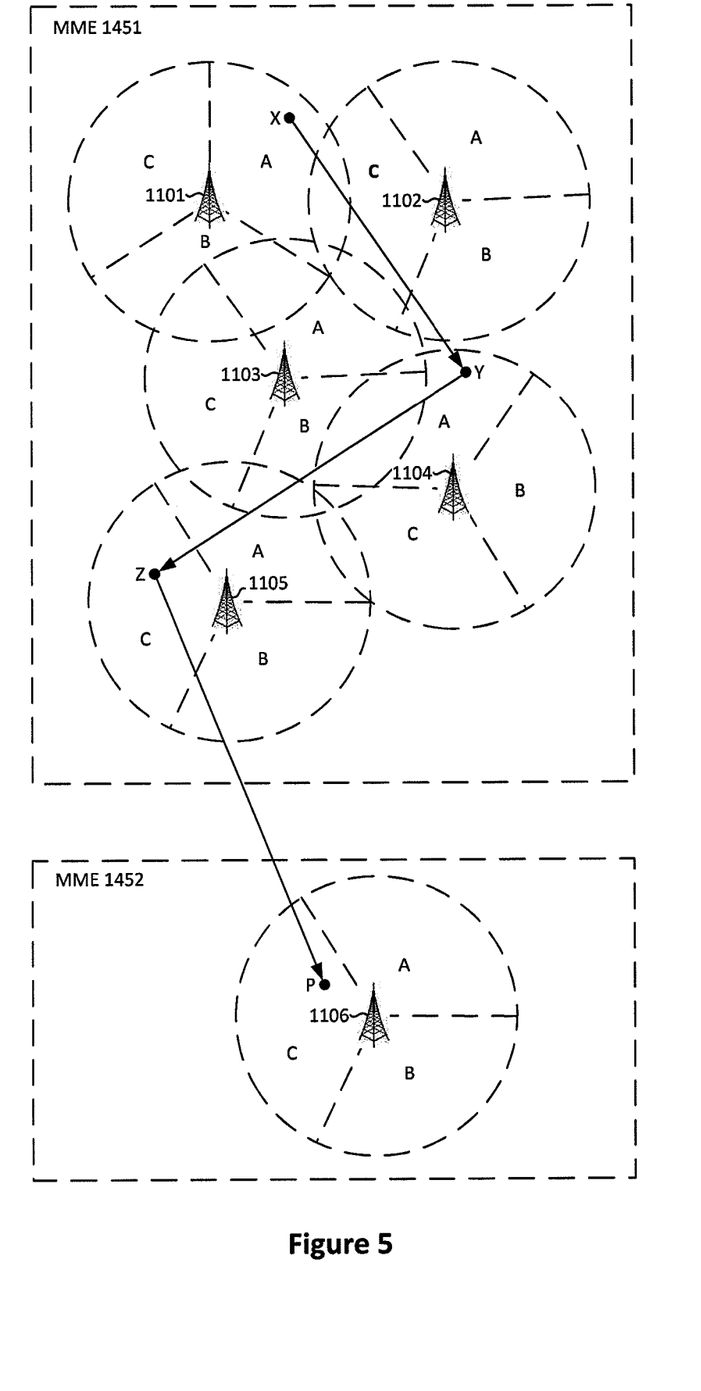
FIG. 5 is a schematic diagram illustrating the conversion of path information.

FIG. 5 illustrates an embodiment of converting the path information. As depicted in FIG. 5, the path information 243 may include moving from point X to point Y, and moving from point Y to point Z. A plurality of base units 1101, 1102, 1103, 1104 and 1105 with illustrative respective covering ranges are also shown. Each base unit illustratively contains cells A, B and C.

Therefore, after the conversion of the path information 243, the converted path information 243 may include: the base unit 1101, the base unit 1102, the base unit 1104, the base unit 1103 and the base unit 1105. Preferably, the converted path information 243 may include: cell A of the base unit 1101, cell C of the base unit 1102, cell B of the base unit 1102, cell A of the base unit 1104, cell B of the base unit 1103, cell A of the base unit 1105 and cell C of the base unit 1105.

FIG. 5 also illustrates moving from point Z to point P. All of base units 1101, 1102, 1103, 1104 and 1105 connect to a MME 1451. Another base unit 1106 connects to another MME 1452. The converted path information for the moving from point Z to point P may include: base unit 1105 of MME 1451 and base unit 1106 of MME 1452.

The converted path information may be used to set specific parameters of the base units 1101, 1102, 1103, 1104 and 1105.

For another example, the expected speed range 242 can be converted into the mobile unit's mobility pattern and/or handover intervals. A mobility pattern refers to the moving speed of the mobile unit, for example, low speed, high speed, etc. . . . The expected speed range also helps predict when a handover from one base unit to another base unit and/or from one cell to another cell would take place.

The expected altitude range 241 also helps predict when a handover takes place. In some embodiments, various contents of the subscription information configuration 200 can be used cooperatively to perform the conversion. For example, the expected speed range 242 and the expected altitude range 241 may be used cooperatively to predict handover intervals.

The explanation goes back to FIG. 4. In step 435, the SCEF 135 sends the converted subscription information configuration to the HSS 140. In step 440, the HSS 140 receives the converted subscription information configuration. In step 450, the HSS 140 stores the converted subscription information configuration. Alternatively, the HSS 140 may replace the existing converted subscription information configuration with the newly received converted subscription information configuration.

Figure 61:
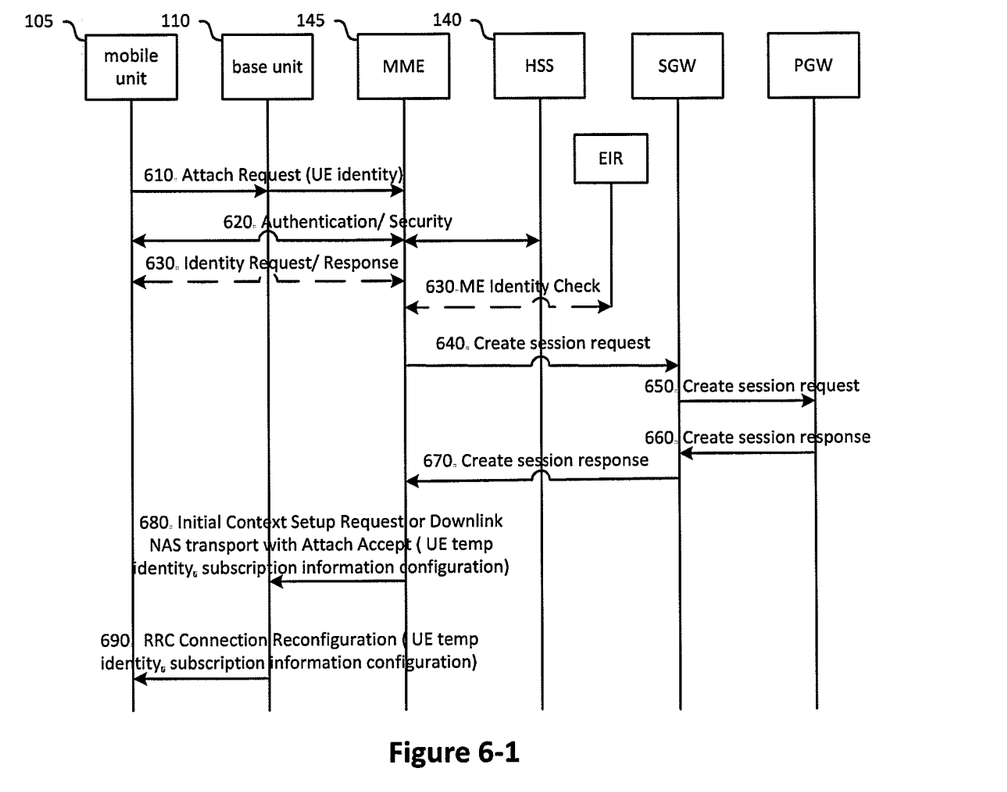

FIG. 6-1 illustrates an attach procedure 600, according to embodiments of the disclosure.

In step 610, a mobile unit 105 sends an Attach Request to the MME 145.

In step 620, the HSS 140 authenticates the mobile unit 105 and sets up NAS security to activate integrity protection and NAS ciphering. If the authentication succeeds, the HSS 140 sends the subscription information configuration 200 as subscription information of the mobile unit 105 to the MME 145. As illustrated in FIG. 2, the subscription information configuration 200 includes the air-borne assistance information 240 and mobility restrictions 230. As explained earlier, the subscription information configuration 200 may preferably be the converted subscription information configuration that is easily understandable by the base unit.

In step 630, an ME Identity (IMEISV) shall be retrieved from the mobile unit 105. The ME identity shall be transferred encrypted. In order to minimize signaling delays, the retrieval of the ME Identity may be performed at the same time as the NAS security setup in step 620. The MME 145 may send the ME Identity Check Request (ME Identity, IMSI) to an EIR. The EIR shall respond with ME Identity Check Ack (Result). Depending upon the Result, the MME 145 decides whether to continue with this attach procedure or to reject the mobile unit.

In step 640, the MME sends the Create session request to SGW.

In step 650, the SGW sends Create session request to PGW.

In step 660, the PGW sends Create session response to SGW.

In step 670, the SGW sends Create session response to MME.

In step 680, the MME sends Initial Context Setup Request or Downlink NAS transport with Attach Accept to the base unit. This message includes UE temp identity and the subscription information configuration 200 (or the converted subscription information configuration). The base unit may use the subscription information configuration 200 (or the converted subscription information configuration) to set specific parameters.

In step 690, the base unit sends RRC Connection Reconfiguration to the mobile unit. This message includes UE temp identity and the subscription information configuration 200 (or the converted subscription information configuration).

In the attach procedure, the subscription information configuration is received at the base unit. The base unit may set its parameters according to the subscription information configuration. Preferably, the subscription information configuration is received at the mobile unit. The mobile unit may adjust its own flying parameters according to the subscription information configuration.

Figure 62:
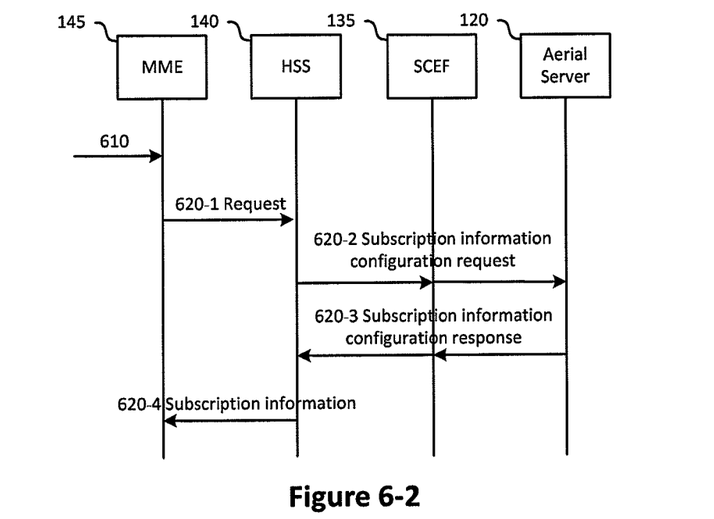

FIG. 6-2 illustrates a detailed embodiment of the step 620 of FIG. 6-1. In FIG. 6, the communications of step 620 are performed among the mobile unit 105, the MME 145 and the HSS 140. FIG. 6-2 describes in detail the communications performed between the MME 145 and the HSS 140. In step 620-1, the MME 145 sends a request to the HSS 140 for the subscription information configuration 200. As discussed earlier with reference to FIG. 6-1, if the authentication by the HSS 140 succeeds, the HSS 140 sends the subscription information configuration 200 as subscription information of the mobile unit 105 to the MME 145.

However, there may exist a situation in which a valid subscription information configuration 200 is unavailable at the HSS 140. For example, the HSS may not receive any subscription information configuration 200. Alternatively, the timer information 250 of the subscription information configuration 200 may indicate that the duration of time for the subscription information configuration 200 has expired in the HSS 140. In this condition, since no valid subscription information configuration 200 is stored at the HSS 140, the HSS 140 is unable to send the subscription information configuration 200 to the MME 145.

In the condition that no valid subscription information configuration 200 is stored at the HSS 140, the HSS 140, in step 620-2, sends a request to the aerial server 120 via the SCEF 135 to request for the subscription information configuration 200. In response, the aerial server 120, in step 620-3, sends a response message including the subscription information configuration 200 to the HSS 140. The step 620-3 may be implemented by the method 300 shown in FIG. 3 or the method 400 shown in FIG. 4. In step 620-4, the HSS 140 sends the subscription information configuration 200 as subscription information of the mobile unit 105 to the MME 145.

The timer information 250 has been discussed as a part of the subscription information configuration 200. The timer information 250 defines the expiration time of the subscription information configuration 200 in the HSS 140. Therefore, according to an embodiment, the subscription information configuration 200 or the converted subscription information configuration contains the timer information 250 when it is stored at the HSS 140. The subscription information configuration 200 or the converted subscription information configuration sent to the base unit 110, as shown in step 680 of FIG. 6-1, may not contain the timer information 250. Needless to say, the subscription information configuration 200 or the converted subscription information configuration sent to the mobile unit 105, as shown in step 690 of FIG. 6-1, may not contain the timer information 250 either.

The step 680 of FIG. 6 indicates that the subscription information configuration 200 is sent from the MME 145 to the base unit 110. The subscription information configuration 200 may be also communicated between different MMEs or between different base units.

With reference to FIG. 5, the mobile unit may move from point X to point Y, or move from point Y to point Z. Due to these movements (location changes), the mobile unit changes its connection with the base unit 1101 to the base unit 1102 then to the base unit 1104 (for the movement from point X to point Y), or changes its connection with the base unit 1104 to the base unit 1103 then to the base unit 1105 (for the movement from point Y to point Z). In response to those location changes, the subscription information configuration 200 may be sent from the base unit 1101 to the base unit 1102 then to the base unit 1104, or may be sent from the base unit 1104 to the base unit 1103 then to the base unit 1105.

Further with reference to FIG. 5, due to the location change of the mobile unit from point Z to point P, the mobile unit changes its connection with the MME 1451 via the base unit 1105 to with the MME 1452 via the base unit 1106. In response to that location change, the subscription information configuration 200 may be sent from the MME 1451 to the MME 1452.

Figure 7:
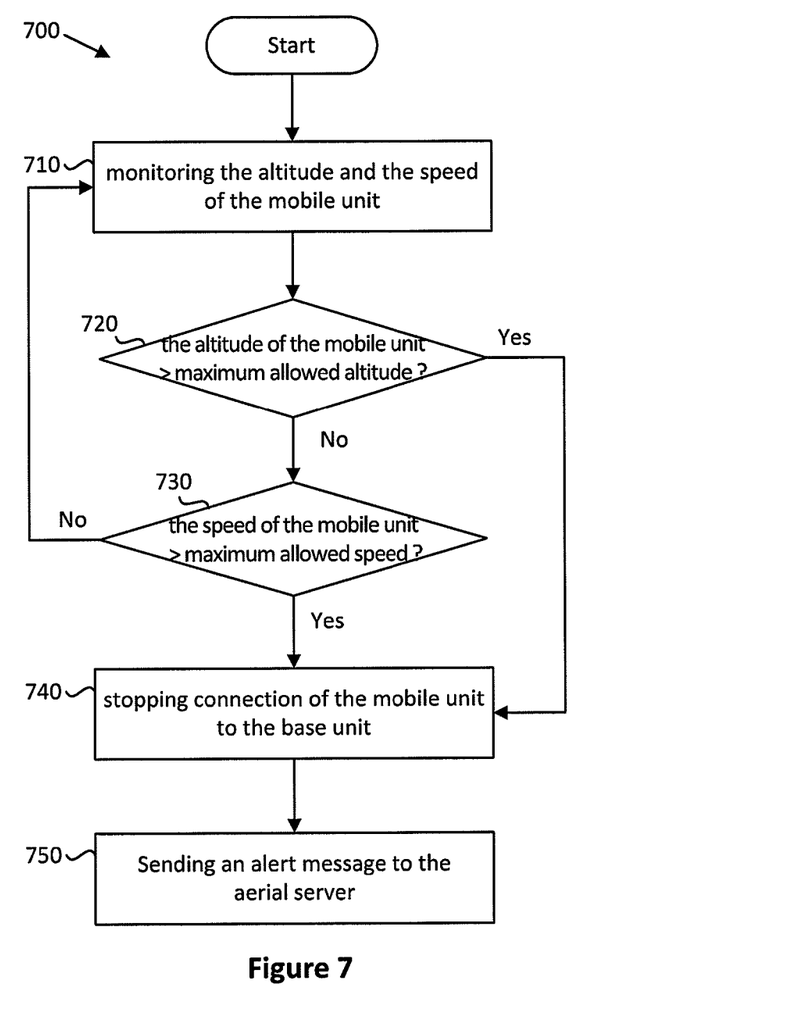
FIG. 7 is a schematic flow chart diagram illustrating one embodiment of a method for mobility restrictions.

FIG. 7 illustrates a method 700 for use of the subscription information configuration, and in particular, the use of the mobility restrictions.

The method starts in response to a particular mobile unit 105 connecting with any of the base unit 110. In step 710, the base unit 110 monitors the altitude and the speed of the mobile unit 105.

In step 720, the altitude of the mobile unit 105 is compared with a maximum allowed altitude, which is determined from the altitude restriction 231. If the altitude of the mobile unit 105 does not exceed the maximum allowed altitude, the method goes to step 730. Otherwise, the method proceeds to step 740.

In step 730, the speed of the mobile unit 105 is compared with a maximum allowed speed, which is determined from the speed restriction 232. If the speed of the mobile unit 105 does not exceed the maximum allowed speed, the method goes back to step 710, in which the base unit 110 continues monitoring the altitude and the speed of the mobile unit 105. Otherwise, the method goes to step 740.

If the altitude of the mobile unit 105 exceeds the maximum allowed altitude, or if the speed of the mobile unit 105 exceeds the maximum allowed speed, the base unit 110 may decide to stop connection of the mobile unit 105 to the base unit 110 in step 740. The step 740 is optional. Even if the altitude of the mobile unit 105 exceeds the maximum allowed altitude, the base unit 110 may still choose to provide connection with the mobile unit 105 if the base unit 110 is able to do it. Even if the speed of the mobile unit 105 exceeds the maximum allowed speed, the base unit 110 may still choose to provide connection with the mobile unit 105 if the base unit 110 is able to do it.

In step 750, the base unit 110 may send an alert message to the aerial server 120. In response to the alert message, the aerial server 120 may choose to send a new subscription information configuration to the core network 130. The new subscription information configuration may change the mobility restrictions to avoid the alert message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving, at an authentication apparatus, a subscription information configuration message transmitted from an external server, wherein the subscription information configuration message includes assistance information that configures parameters of a base unit for a mobile unit, and the assistance information comprises an aerial server identifier, a user equipment identifier, an expiration time of the subscription configuration message, and at least one of an expected altitude range, an expected speed range, path information, and mobility restriction parameters, and wherein, in response to the expiration time elapsing, the subscription configuration message becomes invalid;
authenticating, at the authentication apparatus, the subscription information configuration message, wherein the authentication apparatus authenticates the subscription information configuration message by determining whether the aerial server identifier and the user equipment identifier are valid; and
in response to a success of the authentication, sending the subscription information configuration message to a subscriber server, wherein the subscriber server stores the subscription information configuration message.

2. The method of claim 1, wherein, in response to the success of the authentication, the subscription information configuration message is converted into a format that is understandable by the base unit, and the converted subscription information configuration message is sent to the subscriber server.

3. The method of claim 1, wherein the mobility restriction parameters include altitude restriction which defines a maximum altitude of the mobile unit.

4. The method of claim 3, wherein, in response to the mobile unit flying beyond the maximum altitude, an alert message is sent from the base unit to the external server.

5. The method of claim 1, wherein the mobility restriction parameters include speed restriction which defines a maximum speed of the mobile unit.

6. The method of claim 5, wherein, in response to the mobile unit flying beyond the maximum speed, an alert message is sent from the base unit to the external server.

7. The method of claim 1, wherein storing the subscription information configuration message comprises modifying a previous subscription information configuration message to the subscription information configuration message.

8. The method of claim 1, wherein, in response to a successful authentication of the mobile unit by the subscriber server, the subscription information configuration message is sent from the subscriber server to a control node.

9. The method of claim 8, wherein, in response to a location change of the mobile unit, the subscription information configuration message is sent from the control node to another control node.

10. The method of claim 8, wherein, in response to an attach of the mobile unit to the control node, the subscription information configuration message is sent from the control node to the base unit.

11. The method of claim 10, wherein, in response to a location change of the mobile unit, the subscription information configuration message is sent from the base unit to another base unit.

12. The method of claim 10, wherein the subscription information configuration message is further sent from the base unit to the mobile unit.

13. The method of claim 1, wherein the transmission of the subscription information configuration message is performed in response to a request from the subscriber server.

14. A system comprising an authentication apparatus, wherein the authentication apparatus:

receives a subscription information configuration message from an external server, wherein the subscription information configuration message includes assistance information that configures parameters of a base unit for a mobile unit, and the assistance information comprises an aerial server identifier, a user equipment identifier, an expiration time of the subscription configuration message, and at least one of an expected altitude range, an expected speed range, path information, and mobility restriction parameters, and wherein, in response to the expiration time elapsing, the subscription configuration message becomes invalid;

authenticates the subscription information configuration message, wherein the authentication apparatus authenticates the subscription information configuration message by determining whether the aerial server identifier and the user equipment identifier are valid; and in response to a success of the authentication, sends the subscription information configuration message to a subscriber server, wherein the subscriber server stores the subscription information configuration message.

15. The system of claim 14, wherein, in response to the success of the authentication, the authentication apparatus converts the subscription information configuration message into a format that is understandable by the base unit, and sends the converted subscription information configuration message to the subscriber server.

16. The system of claim 14, wherein the subscriber server requests the external server to transmit the subscription information configuration message to the authentication apparatus.

17. The system of claim 14, further comprising a control node and the base unit, wherein, in response to a successful authentication of the mobile unit by the subscriber server, the subscription information configuration message is sent from the subscriber server to the control node, and wherein, in response to an attach of the mobile unit to the control node, the subscription information configuration message is sent to from the control node to the base unit.

18. A method comprising:

initiating an attach process of a mobile unit, wherein the attach process comprises an aerial server identifier and a user equipment identifier, and authentication of the attach process determines whether the aerial server identifier and the user equipment identifier are valid; and in response to authentication of the attach process, transmitting a subscription information configuration message to a base unit, wherein the subscription information configuration message includes assistance information that configures parameters of the base unit for the mobile unit, and the assistance information comprises the aerial server identifier, the user equipment identifier, an expiration time of the subscription configuration message, and at least one of an expected altitude range, an expected speed range, path information, and mobility restriction parameters, and wherein, in response to the expiration time elapsing, the subscription configuration message becomes invalid.

19. The method of claim 18, further comprising:

obtaining the subscription information configuration message from an external server.

\* \* \* \* \*